United States Patent
Suneya (10) Patent No.: US 8,401,363 B2
(45) Date of Patent: Mar. 19, 2013

(54) DATA PLAYBACK DEVICE, CONTROL METHOD THEREFOR, COMPUTER PROGRAM, AND RECORDING MEDIUM

(75) Inventor: Toru Suneya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1709 days.

(21) Appl. No.: 11/220,557

(22) Filed: Sep. 8, 2005

(65) Prior Publication Data

US 2006/0056801 A1    Mar. 16, 2006

(30) Foreign Application Priority Data

Sep. 10, 2004 (JP) ................................. 2004-264594
Sep. 2, 2005 (JP) ................................. 2005-254707

(51) Int. Cl.
*H04N 5/932* (2006.01)
*H04N 5/783* (2006.01)

(52) U.S. Cl. ........................................ 386/222; 386/343
(58) Field of Classification Search .................. None
See application file for complete search history.

(56) References Cited

U.S. PATENT DOCUMENTS

| | | | |
|---|---|---|---|
| 4,785,349 A * | 11/1988 | Keith et al. | 375/240.23 |
| 6,611,653 B1 * | 8/2003 | Kim et al. | 386/68 |
| 2003/0194210 A1 * | 10/2003 | Shiiyama | 386/68 |
| 2007/0274575 A1 * | 11/2007 | Russo | 382/124 |

\* cited by examiner

*Primary Examiner* — William C Vaughn, Jr.
*Assistant Examiner* — Heather Jones
(74) *Attorney, Agent, or Firm* — Fitzpatrick, Cella, Harper & Scinto (57) ABSTRACT

A data playback device comprising a data reader which reads out moving image data from a storage device that stores the moving image data, a speed detector which detects a reading speed of the moving image data from the storage device, a data rate detector which detects a data rate of the moving image data in playback, a playback speed designation acceptance unit which accepts designation of a playback speed of the moving image data and a controller which controls reading of the moving image data by the data reader on the basis of the reading speed, the data rate, and the designated playback speed.

25 Claims, 8 Drawing Sheets

| DISTINGUISHED RANK | READING SPEED |
|---|---|
| A:High | 4Mbps ～ |
| B:Mid | 2Mbps ～ 4Mbps |
| C:Low | ～ 2Mbps |

FIG. 5

| MOVING IMAGE STREAM DATA | · · · | | · | · · · | | | · | · · · | | | · | · · · | | | · |
|---|---|---|---|---|---|---|---|---|---|---|---|---|---|---|---|
| STORAGE MEDIUM 1 : RANK A | | | | | 1/8 | 1/8 | | | 1/8 | 1/8 | | | 1/8 | 1/8 | 1/8(SEC) |
| STORAGE MEDIUM 1 : RANK B | | | | 1/4 | | | | 1/4 | | | | 1/4 | | | 1/4(SEC) |
| STORAGE MEDIUM 1 : RANK C | | 1/2 | | | | | 1/2 | | | | 1/2 | | | | 1/2(SEC) |

(I FRAM INTERVAL = 1 SEC : 8× DISPLAY IS ASSUMED.)

FIG. 6

DATA PLAYBACK DEVICE, CONTROL METHOD THEREFOR, COMPUTER PROGRAM, AND RECORDING MEDIUM

FIELD OF THE INVENTION

The present invention relates to a data playback device, control method therefor, computer program, and recording medium.

BACKGROUND OF THE INVENTION

Recently, hardware (e.g., a digital camera and digital camcoder) which digitizes content data (e.g., moving image, still image, and audio data) by using an encoding technology for high compression rate, and records the digital data on a memory medium such as a memory card has come onto the market.

These hardware apparatuses often employ, as a video/audio digital encoding function, an encoding format which is high in compression efficiency, error resistance, and the like and can record data of a relatively long time by a limited resource.

Typical examples of the encoding format are MPEG-1, MPEG-2, and MPEG-4 which are standardized by ISO (International Organization for Standardization).

These hardware apparatuses can perform specialized playback such as fast-forward playback in a process of reading out and playing back encoded data recorded on a memory card or the like, particularly in a playback process for moving image data. At this time, only intra compression frames (to be referred to as I frames hereinafter) which can be decoded for each frame may be read out and displayed.

In general, the reading speed of a memory card varies depending on each product. In performing specialized playback, some memory cards are bottlenecked in the data reading speed of the memory card and cannot catch up with reading of I frames used for playback.

In this case, I frames are generally interlaced and played back at a predetermined interval in accordance with the speed of a product whose reading speed is the lowest among memory cards which may be used. Even the use of a memory card having a high reading speed provides only the same playback quality as that of a low-speed memory card.

Also when a plurality of storage devices are switched and used, the frame reading frequency is generally set in accordance with a storage device whose reading speed is the lowest. For this reason, even if the storage device is switched to one having a high reading speed, the quality of a playback image does not improve.

SUMMARY OF THE INVENTION

According to the present invention, a data playback device comprising a data reader which reads out moving image data from a storage device that stores the moving image data, a speed detector which detects a reading speed of the moving image data from the storage device, a data rate detector which detects a data rate of the moving image data in playback, a playback speed designation acceptance unit which accepts designation of a playback speed of the moving image data and a controller which controls reading of the moving image data by the data reader on the basis of the reading speed, the data rate, and the designated playback speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

The following embodiments will mainly describe an encoding format MPEG-1, MPEG-2, or MPEG-4 as a moving image data encoding method. However, the present invention is not limited to an encoding method which executes interframe compression, like MPEG encoding, and can also be applied to an encoding method which forms moving image data by only intra-frame compression, like Motion-JPEG.

In other words, the present invention can be applied to a case wherein encoded moving image data and audio data are read out from a storage medium in a data playback device capable of exchanging, removing, or switching a storage medium and capable of playing back data stored in the storage medium.

First Embodiment

Figure 1:
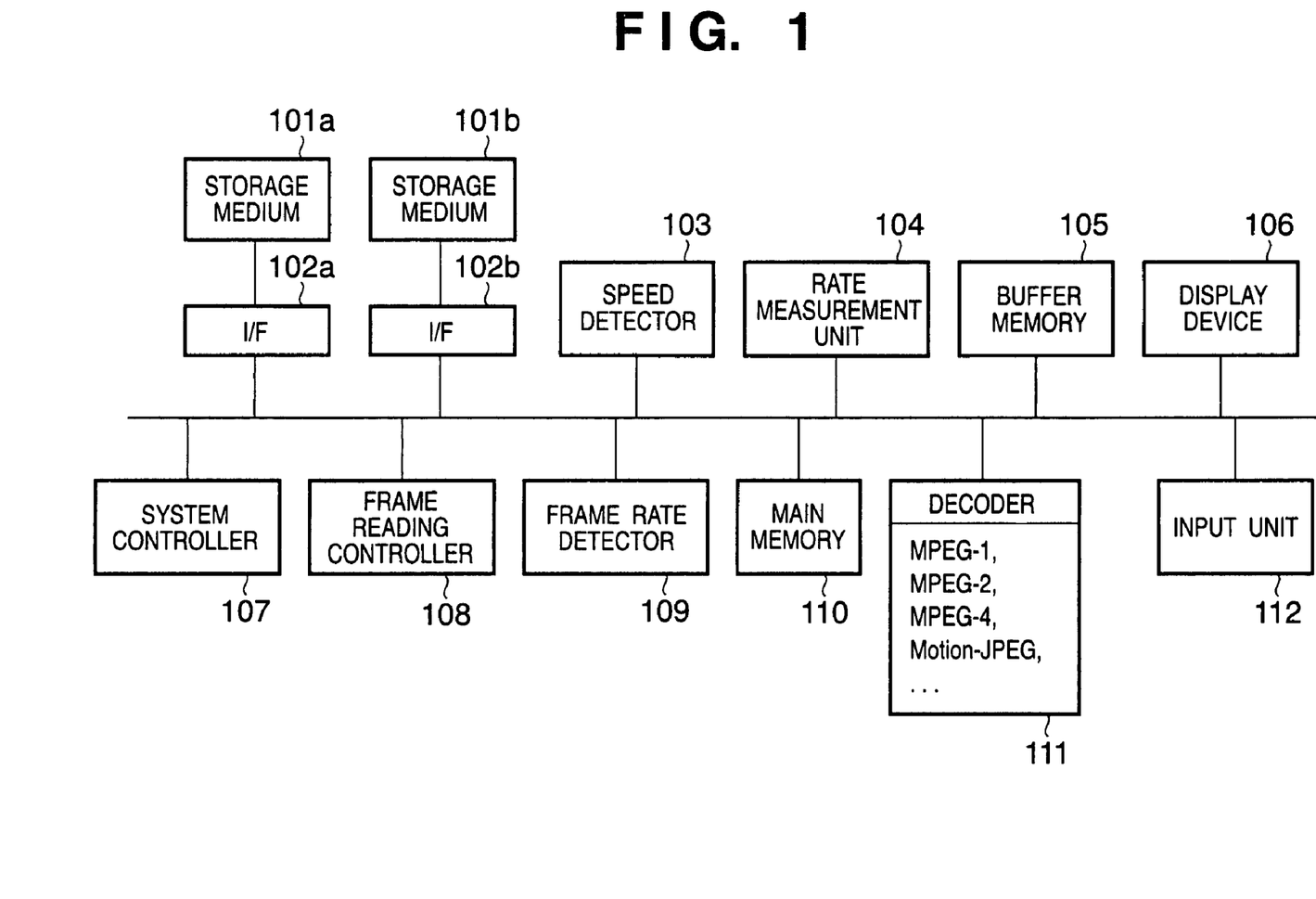
FIG. 1 is a block diagram showing an example of the configuration of a data playback device 100 according to an embodiment of the present invention.

FIG. 1 is a block diagram showing an example of a basic configuration associated with a signal process and data transfer by a data playback device for a moving image and audio data according to the present invention.

In a data playback device 100 in FIG. 1, reference numerals 101a and 101b denote storage media which store encoded moving image data and audio data (the storage media 101a and 101b will be generally referred to as storage media 101 hereinafter). The data playback device 100 is equipped with interfaces 102*a* and 102*b* which can freely mount and dismount the storage media 101, read out recorded data, and record data.

In the data playback device 100, the interfaces 102*a* and 102*b* can be arbitrarily switched as a data recording destination and reading destination. FIG. 1 illustrates two storage medium interfaces, but when the present invention is practiced, the number of storage medium interfaces is at least one and is arbitrary.

Reference numeral 103 denotes a speed detector which detects the reading speed of data from the storage medium 101. Reference numeral 104 denotes a rate measurement unit which measures the data rate (generally represented by the number of bits or bytes per second) of moving image data stored in the storage medium 101. Reference numeral 109 denotes a frame rate detector which detects a frame rate representing the number of frames in the unit time of moving image data stored in the storage medium 101, or detects the number of frames in the unit time for predetermined frames serving as keys among frames. The predetermined frame will be referred to as a key frame in this specification, and is generally an intra compression frame (frame which can be decoded for each frame) and called an I frame.

Reference numeral 105 denotes a buffer memory for temporarily storing data in decoding frame data and audio data of a moving image that are read out from the storage medium 101. Frame data and audio data of a moving image that are temporarily stored in the buffer memory 105 are decoded by a decoder 111, and displayed on a display device 106.

Reference numeral 108 denotes a frame reading controller which controls a method of reading out moving image frame data from the storage medium 101, in accordance with data obtained by the speed detector 103, rate measurement unit 104, and frame rate detector 109. The operations of these units are controlled by a system controller 107.

In a moving image playback process, the system controller 107 comprehensively controls the system shown in FIG. 1, and a main memory 110 provides a storage area necessary for the control. Reference numeral 112 denotes an input unit serving as a user interface. The input unit 112 can accept instructions from the user of the data playback device 100, including a data playback instruction, a playback speed instruction, and an instruction for specialized playback (e.g., fast-forward playback or fast-rewind playback) at an instructed playback speed.

Figure 2:
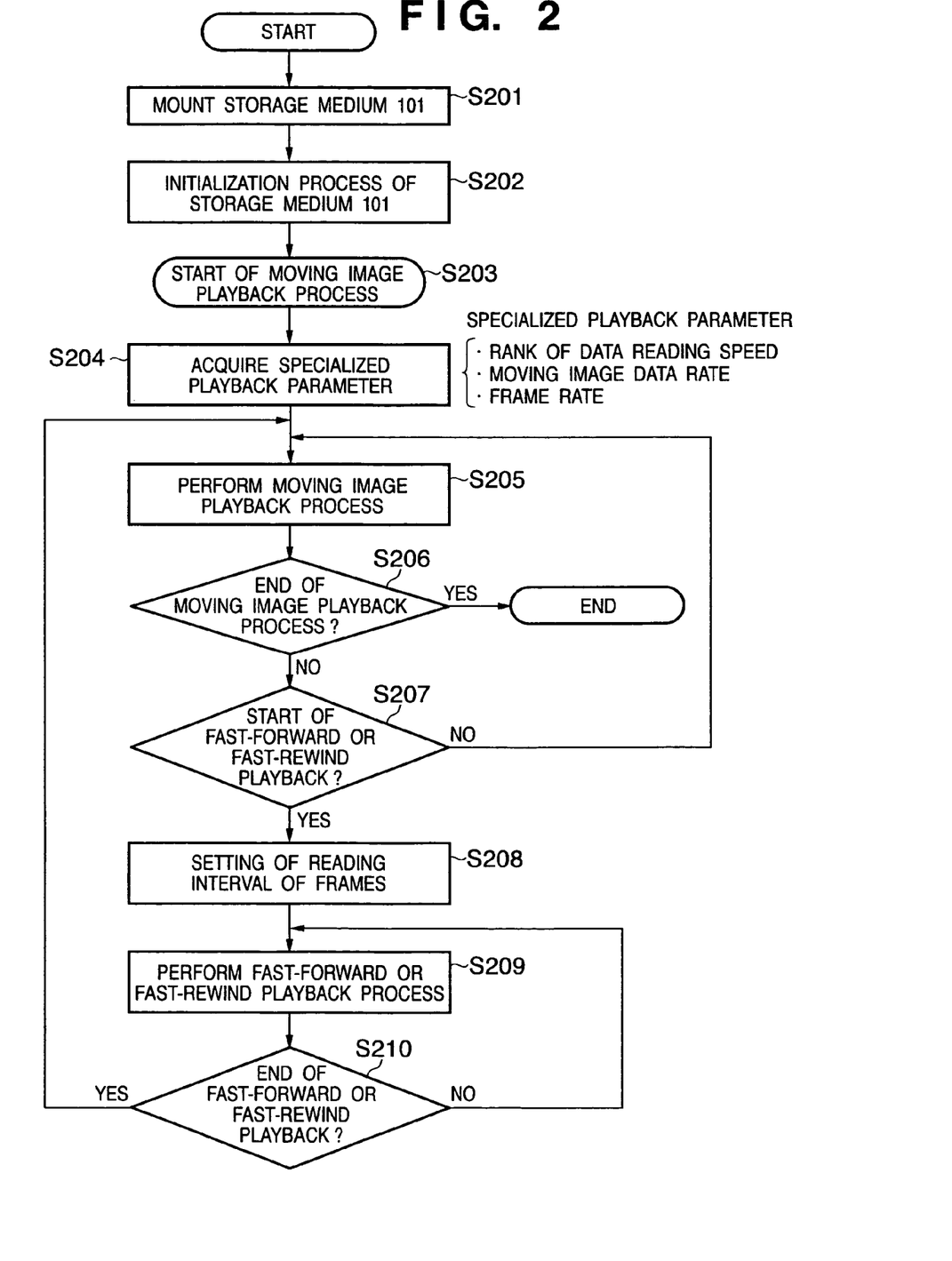
FIG. 2 is a flowchart corresponding to an example of a playback process including specialized playback by the data playback device 100 according to the first embodiment of the present invention.

A process in a playback process which is executed by the data playback device 100 according to the first embodiment and includes specialized playback (e.g., fast-forward playback or fast-rewind playback) will be explained with reference to FIG. 2. FIG. 2 is a flowchart showing an example of the playback process including specialized playback (e.g., fast-forward playback or fast-rewind playback) by the data playback device 100 according to the first embodiment.

The storage medium 101 is mounted into the interface 102 of the data playback device 100 in step S201, and an initialization process is executed in step S202. The initialization process according to the first embodiment means a series of processes of detecting the data reading speed of the storage medium 101 mounted into the interface 102, ranking the reading speed, and recording distinguished rank information at a predetermined location.

If, for example, a playback instruction is accepted from the user via the input unit 112 in step S203 to determine that a moving image playback process is to start, the flow shifts to step S204. In step S204, the rate measurement unit 104 measures the data rate of moving image data in playback, and saves the data rate in the main memory 110. The frame rate detector 109 detects the frame rate of the moving image data, and similarly stores the detected frame rate in the main memory 110. At this time, the data rate and frame rate are saved in the main memory 110 together with the rank of the data reading speed that has already been written in the main memory 110 in the storage medium initialization process of step S202.

In the first embodiment, three parameters, i.e., the rank of the data reading speed of the storage medium 101, the data rate of moving image data in playback, and the frame rate of moving image data are described as a specialized playback parameter at once.

The specialized playback parameter is held in the main memory 110 in step S204, and a moving image playback process starts in step S205. In step S206, the system controller 107 determines whether started playback of the moving image has ended. If playback has ended, the process of this flow ends.

If playback of the moving image has not ended, the flow shifts to step S207, and the system controller 107 determines whether an instruction for specialized playback such as fast-forward playback or fast-rewind playback has been accepted via the input unit 112 during the moving image playback process. If the system controller 107 determines that no specialized playback instruction has been accepted, the flow shifts to step S205 to continue the moving image playback process.

If the specialized playback instruction has been accepted, an instruction for the playback speed (e.g., 2×, 4×, or 8×) in specialized playback is also accepted, and the flow shifts to step S208. In step S208, the frame reading controller 108 performs a process for setting/controlling the reading interval of frames by using the accepted playback speed and the specialized playback parameter held in the main memory 110. The method of setting or controlling the reading interval of frames in step S208 will be described with reference to FIG. 5.

In step S209, the frame reading controller 108 reads out moving image frame data from the storage medium 101 to the buffer memory 105 in accordance with the reading interval of frames that is decided in step S208. The readout data is decoded by the decoder 111 at any time, and displayed on the display device 106. As a result, fast-forward or fast-rewind playback can be executed.

In step S210, the system controller 107 determines whether fast-forward or fast-rewind playback has ended. If it is determined that playback such as fast-forward playback has ended, the flow returns to step S205 to continue a normal playback process. If it is determined that specialized playback such as fast-forward playback has not ended, the flow returns to step S209 to continue the specialized playback process.

Figure 3:
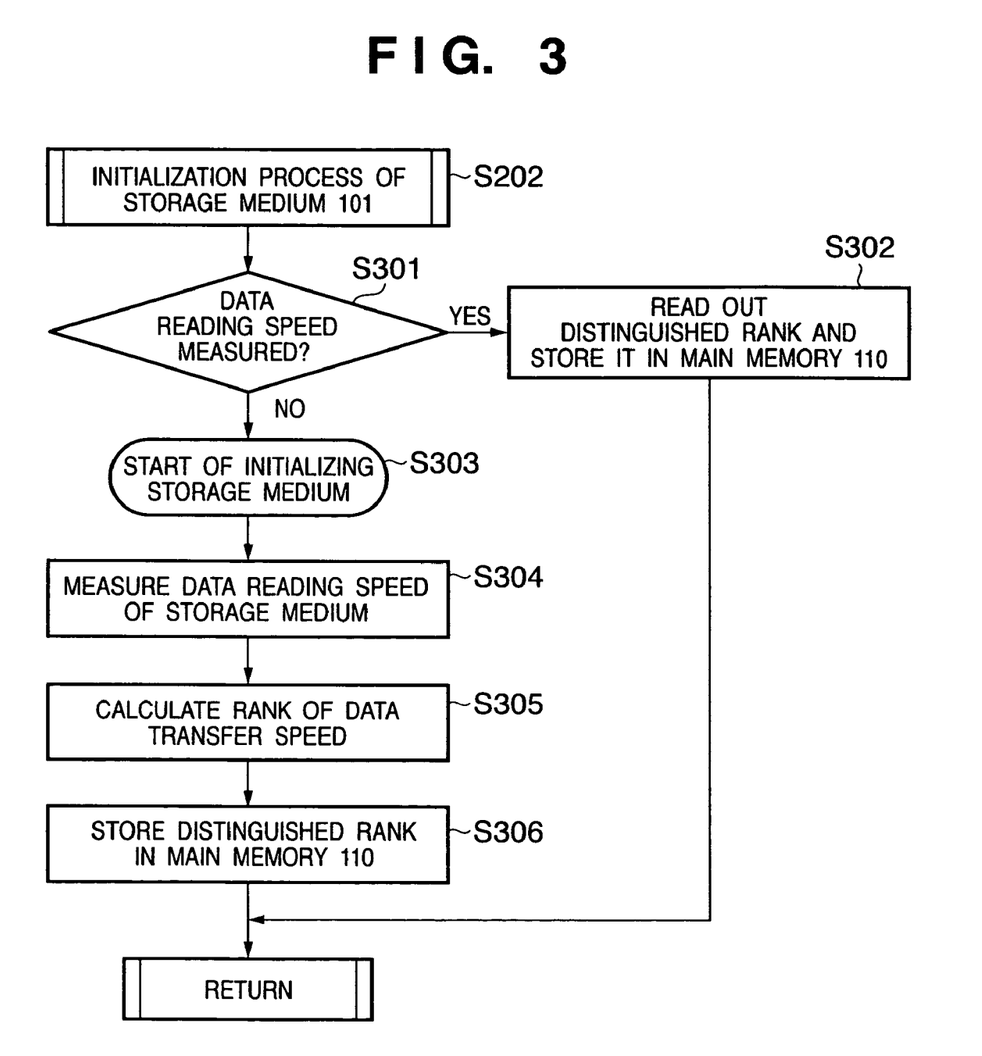
FIG. 3 is a flowchart corresponding to an example of an initialization process according to the first embodiment of the present invention.

Details of the initialization process in step S202 of FIG. 2 will be explained with reference to FIG. 3. FIG. 3 is a flowchart corresponding to a process or an example of the process in the data playback device 100.

When the storage medium 101 is mounted into the storage medium interface of the data playback device 100, the system controller 107 determines the presence/absence of a distinguished rank in step S301. The distinguished rank is rank information which is obtained in accordance with the reading speed of data from the storage medium 101, and is stored at a predetermined location.

The location at which the distinguished rank is stored, and the distinguished rank confirmation method are as follows.

Assume that the distinguished rank is stored in the main memory 110 of the data playback device 100. In this case, the presence/absence of a distinguished rank can be determined by referring to the main memory 110 unless the storage medium 101 is exchanged or dismounted or distinguished rank information stored in the main memory 110 is erased.

Assume that the distinguished rank is stored in the storage medium 101 which stores moving image data and audio data. In this case, the presence/absence of a distinguished rank can be confirmed by determining whether distinguished rank data is stored in the storage medium 101.

In this manner, if the main memory 110 is referred to and a distinguished rank is stored, it can be determined in step S301 that the distinguished rank is stored. Even if a distinguished rank is not stored in the main memory 110 but is stored in the storage medium 101 upon referring to it, it can also be determined that the distinguished rank is stored. If no distinguished rank is stored in either the main memory 110 or storage medium 101, it is determined that no distinguished rank is stored.

By the above process, if it is determined in step S301 that a distinguished rank exists, the flow shifts to step S302. The system controller 107 reads out the distinguished rank from a predetermined storage location, and stores it in the main memory 110.

If it is determined that no distinguished rank exists, the flow shifts to step S303 to execute a storage medium initialization process. In step S304, the speed detector 103 measures the reading speed of data from the storage medium 101. In measurement of step S304, for example, dummy data of a predetermined size is actually stored in the storage medium 101, and a time taken to read out the data is measured. At the end of measurement, the dummy data stored in the storage medium 101 is deleted.

Figure 4:
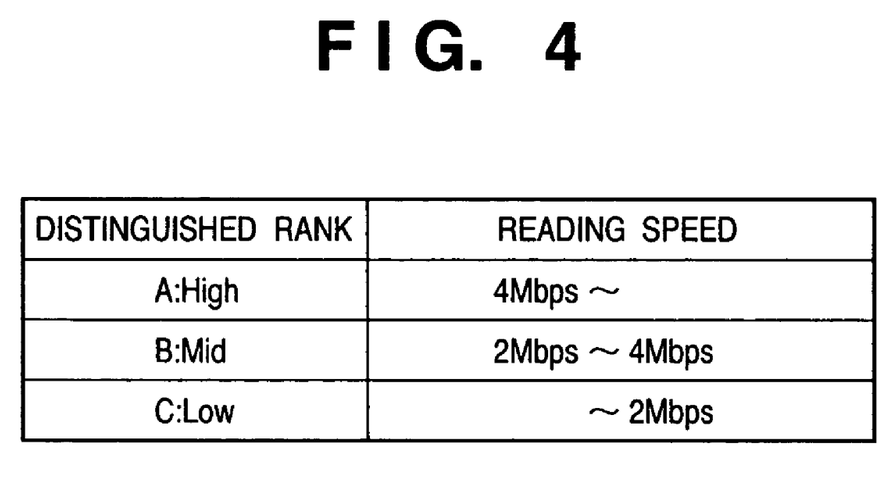
FIG. 4 is a table showing an example of a table for ranking a data reading speed according to the embodiment of the present invention.

In step S305, the system controller 107 calculates the rank of the data reading speed by using the data reading speed measured in step S304. For this purpose, a table (FIG. 4) for ranking a data reading speed is prepared in advance and referred to. Numerical values described in the table of FIG. 4 are merely an example for distinguishing a rank, and a speed belonging to each rank can be arbitrarily changed in accordance with an environment corresponding to the configuration of the data playback device 100.

In step S307, the system controller 107 stores the distinguished rank at a predetermined location. The storage location may be set in the storage medium 101 or in the main memory 110 while the storage medium 101 is mounted in the interface 102. The stored data may not be a distinguished rank but may be actually measured speed data. When measured speed data is to be stored, a ranking process is executed in deciding the reading interval of frames in step S208 of FIG. 2.

After the process in step S306 ends, for example, the main memory 110 which has been used in the initialization process is freed, and the storage medium initialization process ends.

Details of the process executed by the frame reading controller 108 using the specialized playback parameter in step S208 of the flowchart in FIG. 2 will be explained with reference to FIG. 5. The specialized playback parameter includes the data reading speed or distinguished rank of a storage medium, the data rate of moving image data in playback, and the frame rate of moving image data.

Figure 5:
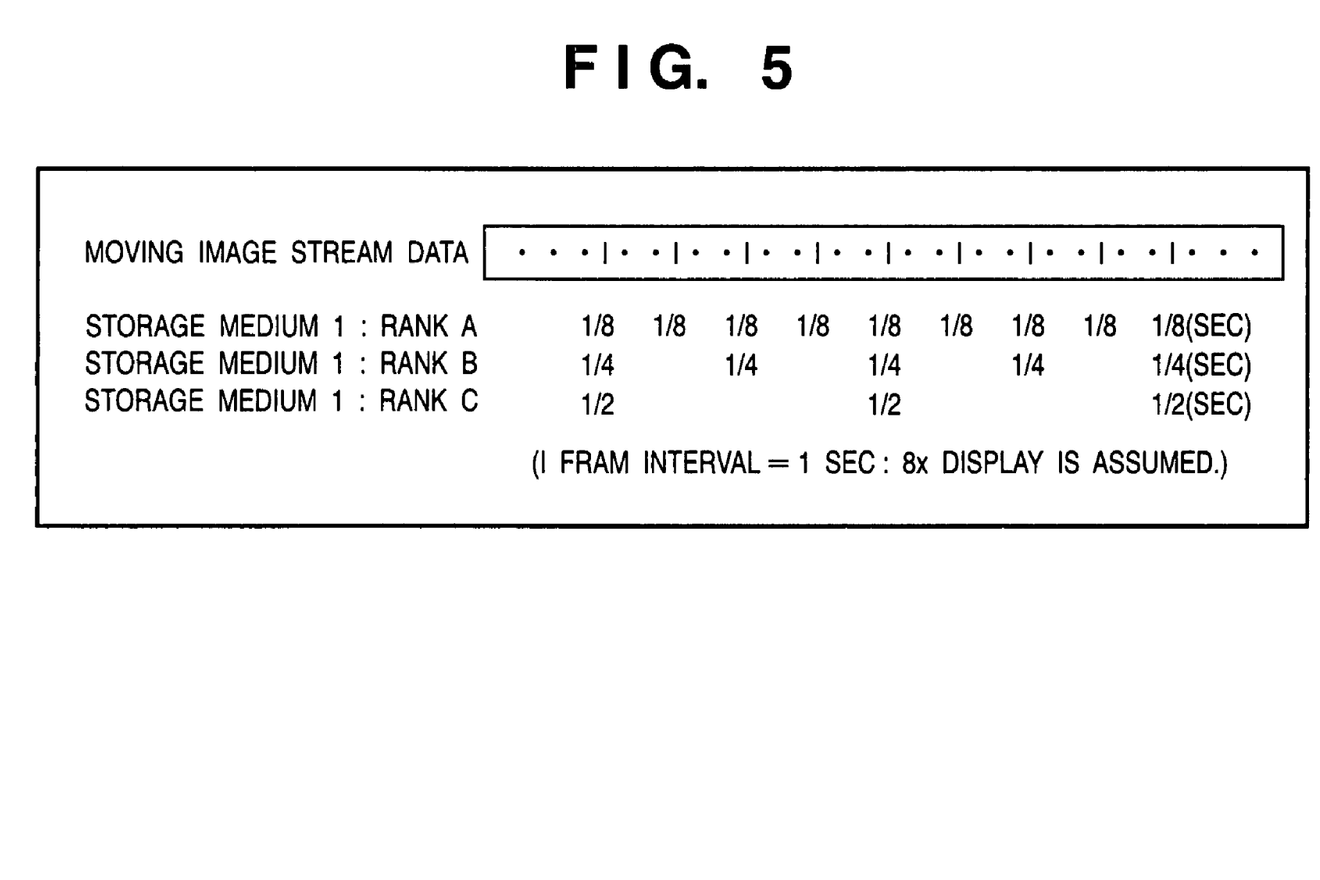
FIG. 5 is a view for explaining the relationship between the data reading speed and a frame to be selected according to the embodiment of the present invention.

FIG. 5 is a view for explaining display control of each frame in accordance with the difference in the data reading speed of the storage medium 101 in the data playback device 100.

FIG. 5 shows, as an example of a concrete control method, an example of display control of each frame in accordance with the difference in the data reading speed of the storage medium 101 when stream data of an MPEG-encoded moving image is displayed at an 8× speed.

Moving image stream data . . . I . . . I . . . I . . . in FIG. 5 represents that I frames exist in stream data at a given interval. When I frames exist in frames, like the stream data in FIG. 5, the frame rate detector 109 in FIG. 1 also measures the time-base rate of I frames in addition to a normal frame rate. If the rate is not fixed in measurement, an average value may be detected or calculated.

FIG. 5 assumes three storage media having different data reading speeds. The data reading speeds of the three storage media correspond to ranks A, B, and C in the rank distinguishing table of FIG. 4.

Each fractional value below the stream data in FIG. 5 represents the time by which I frames are successively displayed from each of three storage media. For example, when an I frame in moving image stream data has a 64-kbyte size at maximum and one I frame appears every second, eight I frames are read out at maximum in 8× playback.

In order to read out eight I frames per second, like a storage medium of rank A, 64 kbytes×8 bits/(⅛sec)=4,096 kbps=4 Mbps A data reading speed of about 4 Mbps is required. Similarly, as for the I frame display times of storage media of ranks B and C, speeds corresponding to the rank distinguishing table in FIG. 4 are necessary to satisfy the display intervals in FIG. 5.

More specifically, in step S208 of FIG. 2, the frame reading controller 108 in FIG. 1 sets a different reading interval of frames for use in accordance with the rank of the data reading speed of the storage medium 101 even when specialized playback is performed at the same speed. Since a larger number of frames can be read out from a storage medium 101 of a high data reading speed in accordance with the reading speed of the storage medium 101, a finer playback image can be obtained.

Setting control of the reading interval of frames influences the data rate of moving image data in playback, the size and frame rate of frames to be read out. When moving image data which are stored in storage media 101 having the same reading speed exist, the reading interval of frames can be narrowed for moving image data of a lower data rate. For moving image data of a lower frame rate, the number of frames which are not displayed in specialized playback relatively decreases.

The contents of control by the frame reading controller 108 of FIG. 1 in frame reading interval setting step S208 of FIG. 2 will be explained in more detail with reference to FIG. 6.

Figure 6:
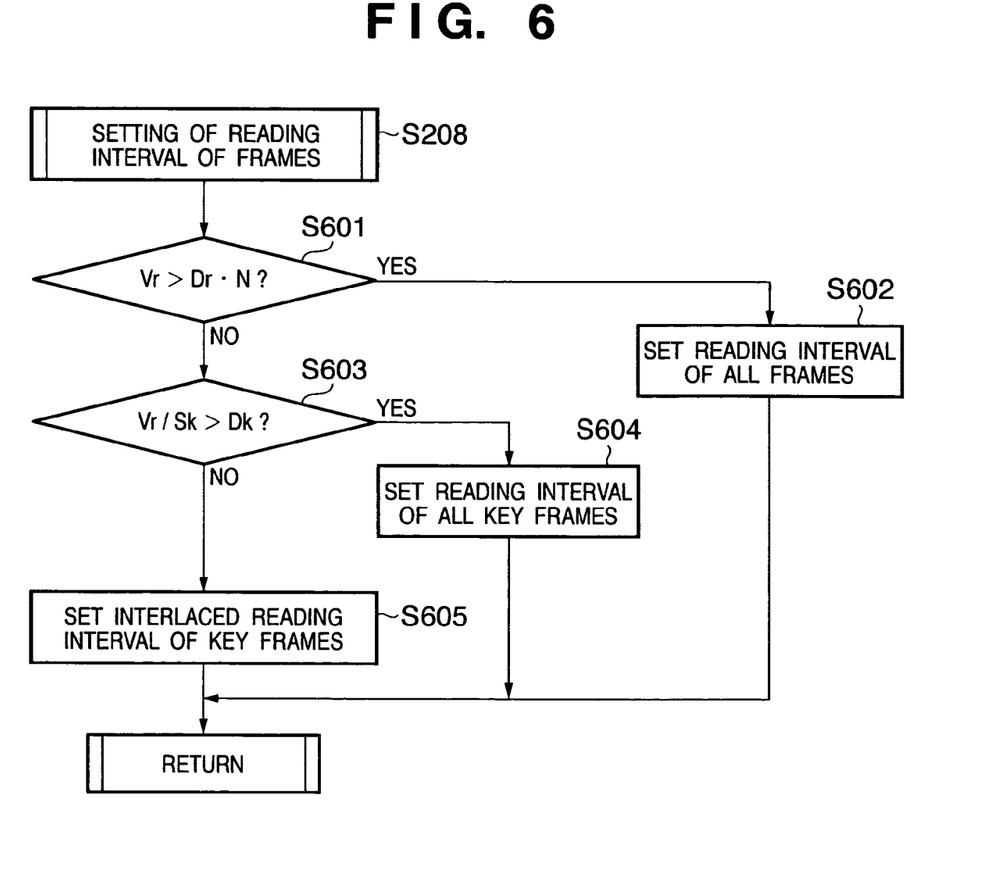
FIG. 6 is a flowchart showing a process of setting the reading interval of frames according to the first embodiment of the present invention.

FIG. 6 is a flowchart corresponding to the frame reading control process of the data playback device 100.

In step S601, a data amount which is decided based on the data rate and playback speed of moving image data and is to be read out in the unit time, and a data amount which is decided based on the reading speed of data from the storage medium 101 and can be read out in the unit time are compared. More specifically, the data rate (Dr) of moving image data subjected to an Nx playback process, and the reading speed (Vr) of data from the storage medium 101 are compared. If it is determined that Vr>Dr·N, i.e., the data reading speed is higher ("YES" in step S601), the flow shifts to step S602 to set the reading interval of frames for reading out all frames from the storage medium 101.

In this case, all frames can be decoded and displayed as far as no problem occurs in the load of another process (e.g., decoding process) accompanying playback/display. However, for moving image data having stream data containing encoded data of intra compression frames, all frames are generally decoded, played back, and displayed in only a forward playback process. To the contrary, a backward playback process uses only key frames having undergone intra-frame compression.

If it is determined that Vr≦Dr·N, i.e., the data reading speed is lower ("NO" in step S601), all frames cannot be read out from the storage medium 101 in Nx playback. Hence, the flow shifts to step S603 to calculate Vr/Sk by dividing the data reading speed Vr of the storage medium 101 by the size (Sk) of key frames expected from the data rate Dr of moving image data or the like. As a result, a frame rate (the number of frames which can be read out per unit time: Frk) when only key frames are successively read out from the storage medium 101 can be obtained. Further, Frk and the key frame interval (Dk) (the number of frames to be read out per unit time in Nx playback: the frame rate of only key frames) of moving image data in Nx playback are compared. For Frk>Dk ("YES" in step S603), a frame interval for reading out all key frames is set.

If Vr/Sk>Dk is established, this means that the number of key frames to be read out per unit time (e.g., one sec) in Nx playback is smaller than the number of key frames readable per unit time (e.g., one sec) from the storage medium 101. All key frames can, therefore, be read out at the reading speed.

In this case, calculation uses the key frame size, and the key frame size can be easily calculated from the data rate of moving image data. For example, when the key frame is four or five times larger in size than a delta-compressed frame, like MPEG-encoded data, the key frame size can be calculated by the following equation (1). Assuming that the size of the key frame is five times larger and a key frame exists every second, the unit of the frame rate is given by fps (frame per second):

$$\{\text{moving image data rate}/(\text{frame rate}+(5-1))\} \times 5 \quad (1)$$

From equation (1), the size of the key frame can be roughly calculated.

The meaning of equation (1) is as follows. The term (frame rate+(5-1)) exhibits a frame rate when a key frame is replaced with a delta-compressed frame. The moving image data rate is divided by the calculated frame rate to obtain the frame size of each delta-compressed frame. Since the size of the key frame is set five times larger than that of the delta-compressed frame, the key frame size can be calculated by "×5".

If Frk≦Dk in step S603 ("NO" in step S603), all key frames cannot be read out in desired Nx display. The flow then shifts to step S605 to decrease the total number of frames to be read out in Nx display to a readable number of frames in accordance with the reading speed Vr of data from the storage medium 101, the frame rate Dk of the key frame, and the size Sk of the key frame. In this way, key frames are properly interlaced to read out frames.

In some cases, the number of key frames contained in moving image data to be read out in the unit time at an Nx playback speed may be larger than the number of key frames readable in the unit time at the data reading speed. In this case, the reading interval of frames is set for a predetermined number of frames selected by interlacing key frames which are to be read out in the unit time at the Nx playback speed.

As described above, the present invention can implement a playback process for moving image data and audio data that exploits the data reading speed of a storage medium or storage device. Even with a storage device using storage media which vary in data reading speed depending on each product, or storage devices which can be switched and vary in data reading speed for each device, encoded data of moving image data and audio data can be efficiently read out to perform specialized playback such as fast-forward playback or fast-rewind playback.

When a storage medium whose data reading speed is high is connected, all frames or all key frames of moving image data can be read out in correspondence with the speed to execute specialized playback (e.g., fast-forward playback or fast-rewind playback) at a predetermined Nx speed. Consequently, a high-quality playback image can be provided even in specialized playback.

When a storage medium whose data reading speed is low is connected, frames to be read out in specialized playback are selected in correspondence with the speed to properly execute specialized playback.

Second Embodiment

The second embodiment of the present invention will be described. In the first embodiment, the data reading speed of a storage medium is measured in advance before specialized playback such as fast-forward playback or fast-rewind playback is done. In the second embodiment, while a specialized playback process is executed, the data reading speed is measured to set the reading interval of frames used for playback.

Figure 7:
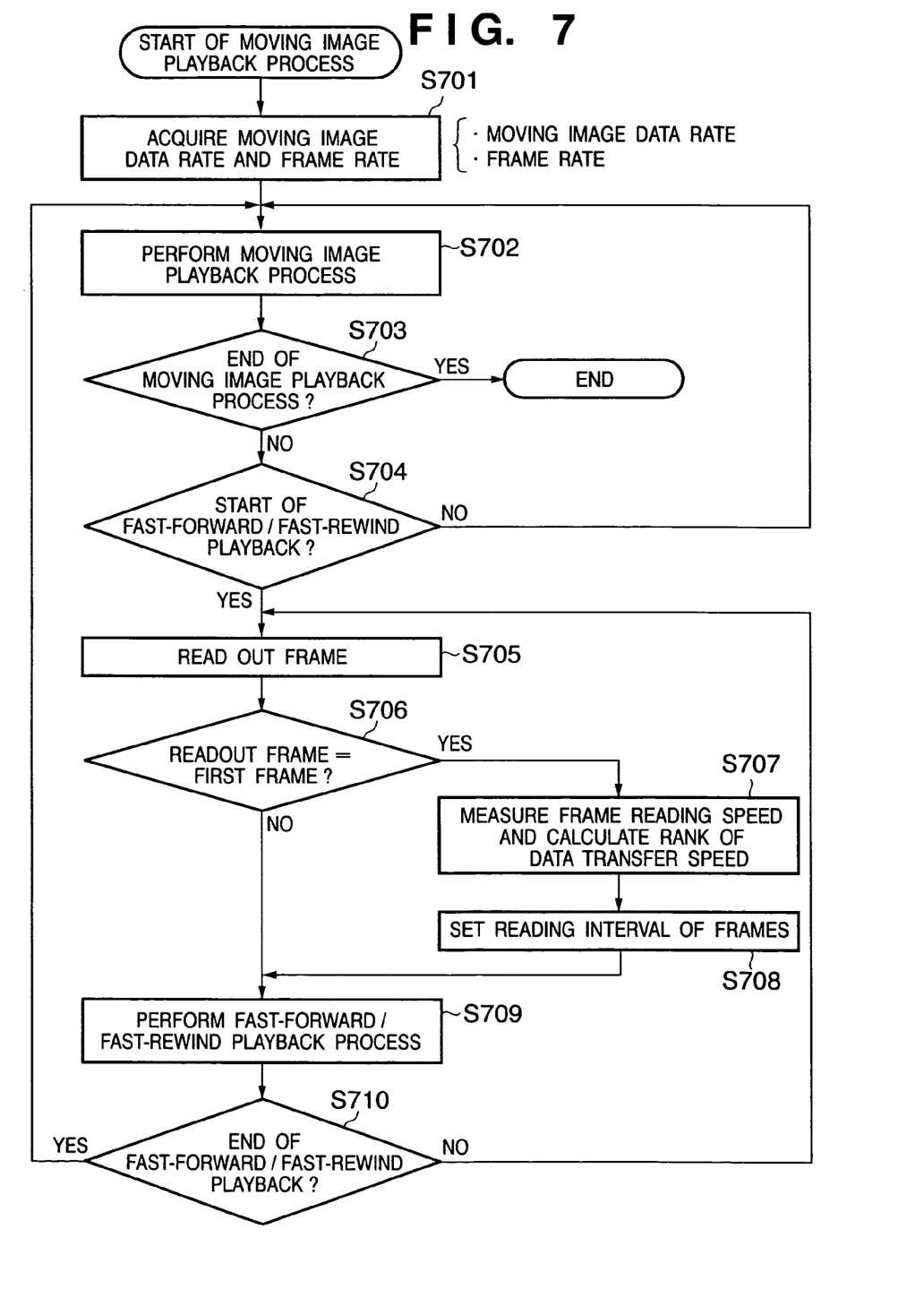
FIG. 7 is a flowchart corresponding to an example of a playback process including specialized playback by a data playback device 100 according to the second embodiment of the present invention.

An example of a process according to the second embodiment will be explained with reference to FIG. 7.

Upon reception of a playback instruction from the user via an input unit 112, the following moving image playback process starts. In step S701, a rate measurement unit 104 measures the data rate of moving image data in playback, and saves the data rate in a main memory 110. A frame rate detector 109 detects the frame rate of the moving image data, and similarly stores the detected frame rate in the main memory 110.

In step S702, a moving image playback process starts. In step S703, a system controller 107 determines whether started playback of the moving image has ended. If playback has ended, the process of this flow ends.

If playback of the moving image has not ended, the flow shifts to step S704, and the system controller 107 determines whether an instruction for specialized playback such as fast-forward playback or fast-rewind playback has been accepted via the input unit 112 during the moving image playback process. If the system controller 107 determines that no specialized playback instruction has been accepted, the flow shifts to step S702 to continue the moving image playback process.

If the specialized playback instruction has been accepted ("YES" in step S704), an instruction for the playback speed (e.g., 2×, 4×, or 8×) in specialized playback is also accepted. The flow shifts to step S705, and a frame reading controller 108 reads out moving image frame data to a buffer memory 105. In step S706, it is determined whether the moving image frame data read out in step S705 is the first frame after the start of fast-forward/fast-rewind playback. If the readout moving image frame data is the first frame, the flow shifts to step S707.

In step S707, a speed detector 103 measures the reading speed of data from a storage medium 101, and the system controller 107 calculates the rank of the data reading speed by using the measured data reading speed. In measurement, a time taken to read out moving image frame data to be actually played back is measured. The rank can be calculated similarly to the process in step S305 of FIG. 3 according to the first embodiment. A calculated distinguished rank is stored in, e.g., the main memory 110 by the system controller 107, similar to the first embodiment.

In step S708, a process for setting/controlling the reading interval of frames by using the playback speed accepted in step S704, and the data rate and frame rate which are held in the main memory 110. This process can be executed similarly to that described with reference to FIG. 5 in the first embodiment.

In step S709, the frame reading controller 108 reads out moving image frame data from the storage medium 101 to the buffer memory 105 in accordance with the reading interval of frames that is decided in step S708. The readout data is decoded by a decoder 111 at any time, and displayed on a display device 106. As a result, fast-forward or fast-rewind playback can be executed.

In step S710, the system controller 107 determines whether fast-forward or fast-rewind playback has ended. If it is determined that playback such as fast-forward playback has ended ("YES" in step S710), the flow returns to step S702 to continue a normal playback process. If it is determined that specialized playback such as fast-forward playback has not ended ("NO" in step S710), the flow returns to step S705 to continue the specialized playback process.

In the above description, when it is determined in step S706 that the readout moving image frame data is the first frame, a process of setting the reading interval of frames is performed in step S708. However, when specialized playback such as fast-forward playback or fast-rewind playback is to be executed, the reading interval of frames can be more accurately set and corrected on the basis of a larger number of frame reading speeds. However, it may be redundant to perform measurement for all frames, and set and correct the reading interval of frames every playback.

For this reason, the process by the route including step S708 is performed by a minimum count. As the "minimum count", the process in FIG. 7 is performed for only the first frame, but the number of frames is not limited to one. For example, reading intervals may be set for the first few frames and averaged.

As described above, according to the second embodiment, the data reading speed can be measured to set the reading interval of frames used for playback while a specialized playback process such as fast-forward playback or fast-rewind playback is executed.

Third Embodiment

In executing specialized playback, a more smooth playback image can be obtained by reading out a larger number of frames from a storage medium 101 and displaying the image. In a situation in which the data rate is low when the data rate varies, a smooth playback image can be attained by reading out and displaying a larger number of frames within the range of the reading speed of the storage medium 101.

There is ISO Base Media File Format (ISO/IEC 14496 Part 12) which is defined by ISO as an MPEG-4 file format. According to this format, moving image data holds the size information, decoding time, and display time of each frame of the moving image data. If the size information and time information are acquired, the data rate of a frame per predetermined time can be calculated. Further, if a threshold corresponding to the reading speed of the storage medium 101 is set, the reading interval of frames can be controlled in accordance with a rate for each situation.

Figure 8:
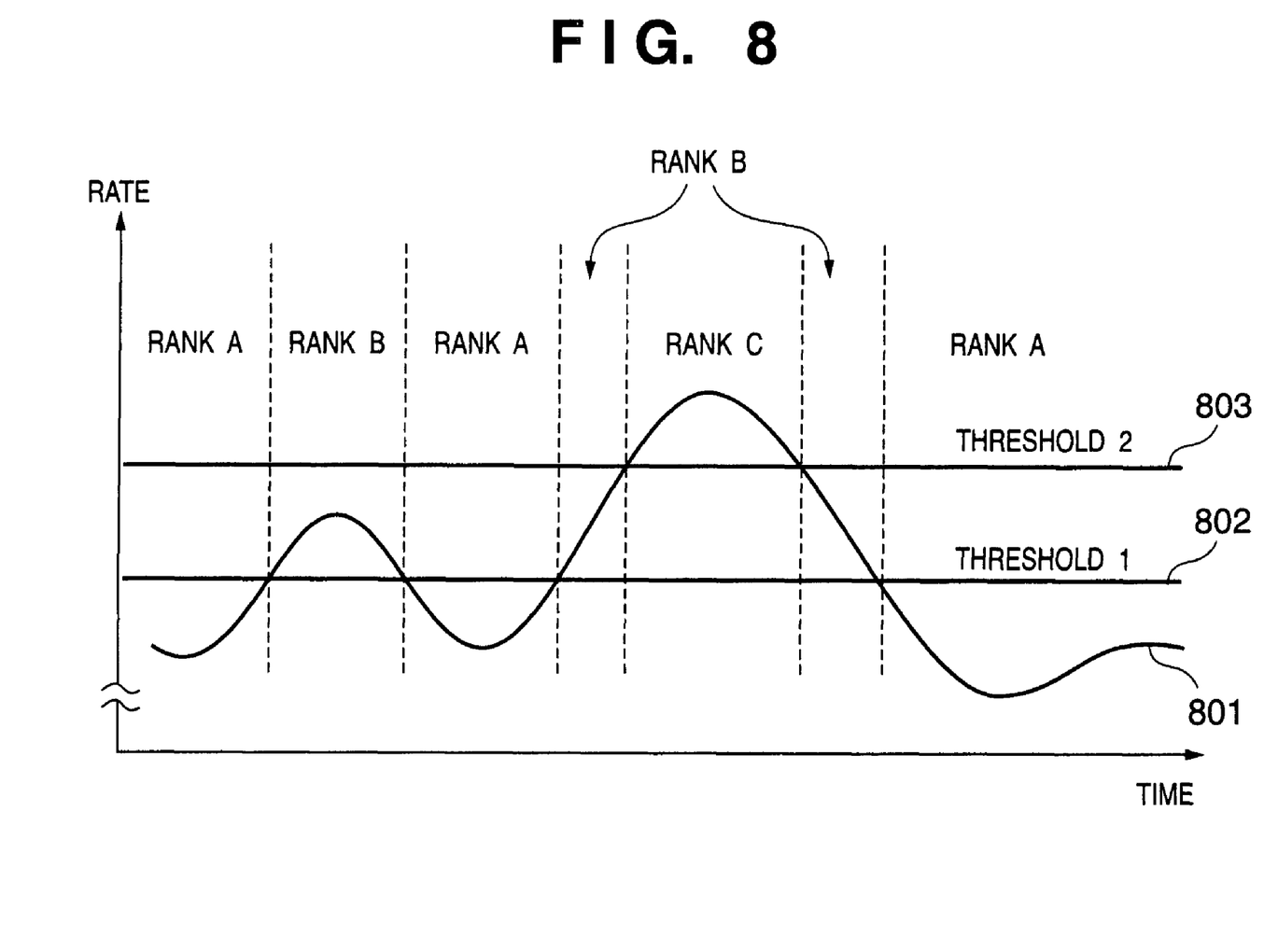
FIG. 8 is a graph for explaining setting of a distinguished rank on the basis of the data rate of moving image data according to the third embodiment of the present invention.

An example of control operation will be explained with reference to FIG. 8. In FIG. 8, the axis of abscissa represents the time, and the axis of ordinate represents the data rate of a moving image. Reference numeral 801 denotes moving image data to be played back, and the data rate of the moving image data 801 at predetermined time is shown in FIG. 8. Reference numerals 802 and 803 denote thresholds at the data rate. Threshold 1 (802) is a threshold on the lower side of the data rate. When the data rate is lower than threshold 1 (802), all key frames used for specialized playback can be read out. When the data rate is higher than threshold 1 (802), a predetermined number of frames are interlaced from all key frames used for specialized playback, and key frames are read out. Threshold 2 (803) is a threshold on the upper side of the data rate. When the data rate is higher than threshold 2 (803), the number of frames to be interlaced from all key frames used for specialized playback is increased, and key frames are read out.

In FIG. 8, when the data rate of the moving image data 801 is equal to or lower than threshold 1 (802), the reading interval of frames is classified into rank A. When the data rate of the moving image data 801 is higher than threshold 1 (802) and equal to or lower than threshold 2 (803), the reading interval of frames is classified into rank B. When the data rate of the moving image data 801 is higher than threshold 2 (803), the reading interval of frames is classified into rank C. Ranks A to C are identical to those shown in FIG. 5 according to the first embodiment.

An example of the value of threshold 1 (802) will be examined. Similar to the first embodiment, Dr represents the data rate of moving image data subjected to an Nx playback process, and Vr represents the reading speed of data from the storage medium 101. Also, Fr represents the frame rate of moving image data, and Sk represents the data size of a key frame. For descriptive convenience, only one key frame appears every second. These parameters can be applied to equation (1) according to the first embodiment:

$$Sk = \{Dr/(Fr+4)\} \cdot 5 \qquad (1)'$$

When all key frames are read out in an Nx playback process, $Vr > Sk \cdot N \ldots (2)$ is established. Formulas (1)' and (2) lead to $Vr > 5N\{Dr/(Fr+4)\}$. By solving this inequality, $Vr(Fr+4)/5N > Dr$. That is, threshold 1 (802) is $Vr(Fr+4)/5N$.

Also, threshold 2 (803) can be obtained as $N \rightarrow N/2$.

As described above, the threshold can be set in advance as far as the reading speed of data from the storage medium 101 and the frame rate and playback speed of moving image data are known in advance.

When, of the moving image data 801, data classified into rank A undergoes specialized playback, all I frames are displayed by reading out I frames for use without interlacing them. When data classified into rank B undergoes specialized playback, I frames are interlaced to ½ and displayed. When data classified into rank C undergoes specialized playback, I frames are interlaced every ¼ interval and displayed.

As described above, according to the third embodiment, specialized playback can be done by adjusting the reading interval of frames in accordance with a data rate for each situation.

Other Embodiments

Note that the present invention can be applied to an apparatus comprising a single device or to system constituted by a plurality of devices.

Furthermore, the invention can be implemented by the steps of supplying a non-transitory computer-readable storage medium that retrievably stores a computer-executable software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in and executable by the computer also implements the present invention. In other words, the claims of the present invention also cover a computer program installed in and executable by a computer for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, which is thereafter read and executed by a computer, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer, and which are read and executed by a computer, is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-264594 filed on Sep. 10, 2004 and Japanese Patent Application No. 2005-254707 filed on Sep. 2, 2005, the entire contents of which are hereby incorporated by reference herein.

What is claimed is:

1. A data playback device comprising:
a determining unit constructed to determine whether reading speed information indicating a reading speed of a first storage device is stored in the first storage device or in a second storage device, wherein the reading speed of the first storage device corresponds to an amount of data readable from the first storage device in a unit time;
a speed detector constructed to detect the reading speed of the first storage device;
a controlling unit constructed to, in a case where the determination unit determines that the reading speed information of the first storage device is stored in the first storage device or the second storage device, control the number of frames of the moving image data in the first storage device to be read for playback in a unit time based on the reading speed indicated by the stored reading speed information, and in a case where the determination unit determines that the reading speed information of the first storage device is not stored in either the first storage device or the second storage device, control the number of frames of the moving image data in the first storage device to be read for playback in a unit time based on the reading speed detected by the speed detector; and
a store controlling unit constructed to store the reading speed information indicating the reading speed detected by the speed detector in the first storage device or in the second storage device.

2. The device according to claim 1, further comprising a data amount detector constructed to detect a first amount of data to be read out in a unit time for playing back the moving image data at an input playback speed of the moving image data and at a data rate of the moving image data in playback,
wherein the controlling unit sets a reading interval of frames of the moving image data in the first storage device such that frames corresponding to the first amount of data are read out when the first amount of data is smaller than an amount of data readable from the first storage device in a unit time.

3. The device according to claim 2, wherein the data amount detector is constructed to detect a second amount of data to be read out in a unit time for playing back the moving image data, by reading out predetermined frames included in frames of the moving image data at the input playback speed and at a data rate of the moving image data in playback, and
wherein the controlling unit sets the reading interval such that the predetermined frames included in the frames of the moving image data are read out when the second amount of data is smaller than an amount of data readable from the first storage device in a unit time.

4. The device according to claim 3, wherein the predetermined frames are frames which can be decoded for each frame among frames contained in the moving image data.

5. The device according to claim 2, wherein the controlling unit sets the reading interval such that a predetermined number of frames among the predetermined frames are read out when the second amount of data is larger than an amount of data readable from the first storage device in a unit time.

6. The device according to claim 1, wherein the first storage device includes a storage medium removable from a data reader.

7. The device according to claim 1, wherein said speed detector detects the reading speed by measuring a time taken to read out from the first storage device a predetermined amount of data written in the first storage device.

8. The device according to claim 1, further comprising an input unit constructed to input a playback speed of the moving image data,
   wherein the speed detector detects the reading speed when said input unit inputs a playback speed higher than a normal playback speed.

9. The device according to claim 1, wherein the moving image data is stored in the first and second storage devices as a moving image file which includes size information of each frame of the moving image data,
   wherein the device further comprises a data rate detector constructed to acquire a data rate of the moving image data in playback, the data rate being acquired based on the size information included in the moving image file, and
   wherein the controlling unit comprises a reading interval decision unit constructed to compare the data rate and a predetermined threshold to decide a reading interval of frames that form the moving image data, and the controlling unit controls playback of the moving image data on the basis of the reading interval.

10. The device according to claim 9, wherein the reading interval decision unit sets the reading interval such that the predetermined frames included in frames of the moving image data are played back in a unit time when the data rate is lower than the predetermined threshold.

11. The device according to claim 9, wherein the reading interval decision unit sets the reading interval such that a predetermined number of frames among predetermined frames are played back in a unit time at the playback speed when the data rate is higher than the predetermined threshold.

12. The device according to claim 1, wherein the speed detector detects a first amount of data readable from a first storage device in a unit time and detects a second amount of data readable from a second storage device in the unit time, wherein the second amount of data is less than the first amount of data; and
   wherein the controlling unit controls, based on the first amount of data, a first number of frames of the moving image data stored in the first storage device to be read for playback in a unit time so as to be more than a second number of frames of the moving image data stored in the second storage device to be read for playback in the unit time wherein the second number of frames is determined based on the second amount of data.

13. A method of controlling a data playback device, comprising:
   a determining step of determining whether reading speed information indicating a reading speed of a first storage device is stored in the first storage device or in a second storage device, wherein the reading speed of the first storage device corresponds to an amount of data readable from the first storage device in a unit time;
   a speed detection step of detecting the reading speed of the first storage device; and
   a controlling step of, in a case where it is determined at the determining step that the reading speed information of the first storage device is stored in the first storage device or the second storage device, controlling the number of frames of the moving image data in the first storage device to be read for playback in a unit time based on the reading speed indicated by the stored reading speed information, and in a case where it is determined at the determining step that the reading speed information of the first storage device is not stored in either the first storage device or the second storage device, controlling the number of frames of the moving image data in the first storage device to be read for playback in a unit time based on the reading speed detected at the speed detection step; and
   a store controlling step of storing the reading speed information indicating the reading speed detected at the speed detection step in the first storage device or in the second storage device.

14. The method according to claim 13, further comprising a data amount detection step of detecting a first amount of data to be read out in a unit time for playing back the moving image data at an input playback speed of the moving image data and at a date rate of the moving image data in playback,
   wherein the controlling step sets a reading interval of frames of the moving image data in the first storage device such that frames corresponding to the first amount of data are read out when the first amount of data is smaller than an amount of data readable from the first storage device in a unit time.

15. The method according to claim 14, wherein
   at the data amount detection step, detecting a second amount of data to be read out in a unit time for playing back the moving image data, by reading out predetermined frames included in frames of the moving image data at the input playback speed and at a data rate of the moving image data in playback, and
   wherein at the controlling step, the reading interval is set such that the predetermined frames included in the frames of the moving image data are read out when the second amount of data is smaller than an amount of data readable from the first storage device in a unit time.

16. The method according to claim 15, wherein the predetermined frames are frames which can be decoded for each frame among frames contained in the moving image data.

17. The method according to claim 14, wherein at the reading interval decision step, the reading interval is set such that a predetermined number of frames among the predetermined frames are read out when the second amount of data is larger than an amount of data readable from the first storage device in a unit time.

18. The method according to claim 13, wherein the first storage device includes a removable storage medium.

19. The method according to claim 13, wherein in the speed detection step, the reading speed is detected by measuring a time taken to read out from the first storage device a predetermined amount of data written in the first storage device.

20. The method according to claim 13, further comprising an input step of inputting a playback speed of the moving image data,
   wherein at the speed detection step, the reading speed is detected when a playback speed higher than a normal playback speed is input at the input step.

21. The method according to claim 13, wherein the moving image data is stored in the first and second storage devices as a moving image file which includes size information of each frame of the moving image data,
   wherein the method further comprises a data rate detection step of acquiring a data rate of the moving image data in playback, the data rate being acquired based on the size information included in the moving image file, and
   wherein the controlling step comprises a reading interval decision step of comparing the data rate and a predetermined threshold to decide a reading interval of frames that form the moving image data, and in the controlling step, playback of the moving image data is controlled on the basis of the reading interval.

22. The method according to claim 21, wherein in the reading interval decision step, the reading interval is set such that predetermined frames included in frames of the moving image data among frames are read out for playback in a unit time when the data rate is lower than the predetermined threshold.

23. The method according to claim 21, wherein in the reading interval decision step, the reading interval is set such that a predetermined number of frames among predetermined frames are played back in a unit time at the playback speed when the data rate is higher than the predetermined threshold.

24. The method according to claim 13, wherein at the speed detection step, detecting a first amount of data readable from a first storage device in a unit time and detecting a second amount of data readable from a second storage device in the unit time, wherein the second amount of data is less than the first amount of data; and at the controlling step, controlling, based on the first amount of data, a first number of frames of the moving image data stored in the first storage device to be read for playback in a unit time so as to be more than a second number of frames of the moving image data stored in the second storage device to be read for playback in the unit time wherein the second number of frames is determined based on the second amount of data.

25. A non-transitory computer readable storage medium which retrievably stores a computer program that causes a computer to execute a data playback device control method defined in claim 13.

* * * * *